United States Patent [19]

Chi et al.

[11] Patent Number: 4,963,161
[45] Date of Patent: Oct. 16, 1990

[54] NON-AQUEOUS ALKALI BATTERY HAVING AN IMPROVED CATHODE

[75] Inventors: Ignacio Chi, North Andover, Mass.; Wei-Chou Fang, Bridgewater, N.J.

[73] Assignee: AT&T Bell Laboratories, Murray Hill, N.J.

[21] Appl. No.: 377,504

[22] Filed: Jul. 10, 1989

[51] Int. Cl.⁵ .............................................. H01M 6/00
[52] U.S. Cl. .................................. 29/623.5; 429/197; 429/218
[58] Field of Search ........................ 429/194, 218, 197; 29/623.5, 730

[56] References Cited

U.S. PATENT DOCUMENTS

| | | | |
|---|---|---|---|
| 3,864,167 | 2/1975 | Broadhead et al. | 136/6 |
| 4,091,191 | 5/1978 | Gaines | 429/194 |
| 4,740,433 | 4/1988 | Lu | 429/94 |
| 4,753,859 | 6/1988 | Brand | 429/197 |

OTHER PUBLICATIONS

Pending U.S. application filed May 18, 1989, Ser. No. 353,574, S. M. granstaff et al.
Pending U.S. application filed Sep. 14, 1988, Ser. No. 244,218, W. Fang et al.

*Primary Examiner*—Anthony Skapars
*Attorney, Agent, or Firm*—Oleg E. Alber

[57] ABSTRACT

This invention relates to a process of fabricating a rechargeable non-aqueous cell and to a cell produced by the process. The cell includes a unique laminated cathode structure. Other structural features of the non-aqueous cell including anode, non-aqueous electrolyte and separator, are generally conventional. The novel cathode is composed of a current collector consisting of an unperforated metal foil to which are bonded mats of cathode active material, selected from transition-metal chalcogenides. In the process of forming the cathode, a non-perforated metal foil, such as aluminum, is coated with a layer of bonding polymer and after the mats of cathode-active material, such as niobium triselenide, are placed on both sides of the metal foil, the composite is compacted, preferably by passing between rollers. Electronic conduction is enhanced by either admixing carbon black with the polymer or coating that surface of the mats which is to be in contact with the metal foil, with a thin layer of carbon black. This design results in cells which show a distinct improvement in energy at higher rate discharges, e.g. at 3–4A, or at lower temperatures, e.g. −20° C., lower cost and weight than cells with conventional cathode collector having screen or grid of expanded metal, e.g. Ni, and are expected to ameliorate internal shorts resulting from the use of ex-met grids.

21 Claims, 8 Drawing Sheets

NON-AQUEOUS ALKALI BATTERY HAVING AN IMPROVED CATHODE

The invention relates to a process for fabricating a rechargeable non-aqueous cell and to cell produced by this process.

BACKGROUND OF THE INVENTION

Rapid increase in consumer interest in a variety of technologies such as portable power tools calculators, computers, cordless telephones, garden tools, portable televisions, radios, tape recorders, as well as back-up power sources in computer technology, memory devices, security systems, to name a few, has increased the demand for reliable, ligh-weight, high-energy power sources. Recent developments in high energy density cells have focused attention on anodes of alkali metal, non-aqueous electrolytes and cathode-active materials of nonstoichiometric compounds. Alkali metals, particularly lithium, are use as anode-active materials because they are highly electro-negative, thereby providing high energies per weight unit. Self-discharge of cells employing alkali metal as the anode-active material is minimized by employing non-aqueous solvents which are not reducible by the highly reactive anode mateials, thus enabling an exceptionally long shelf life.

Cathode active materials generally include transition metal chalcogenides such as $NbSe_2$, $NbSe_3$, $NbS_3$, $MoS_2$, $MoS_3$, $TiS_2$, $TiS_3$, $TaSe_3$, $TaS_2$, $V_6O_{13}$, $CoO_2$ and $MoO_2$. These materials, especially niobium selenide, niobium triselenide, and niobium trisulfide, which are described in U.S. Pat. No. 3,864,167 issued to J. Broadhead et al. on Feb 4, 1975, have excellent capacities, good recycling properties and are very compatible with the alkali metals, especially lithium. The chalcogenide compounds are electronic conductor; however, their conductivity is not nearly as great as of metallic conductors. Therefore, the conductivity of the cathode structure is typically improved by admixing carbon black or particulate metal with the cathode-active material and/or supporting the cathode-active material on a metal grid or screen to improve current collection. Such metals may be selected from magnesium, aluminum titanium, zinc, lead, iron, nickel, copper, and alloys thereof.

U.S. Pat. No. 4.091,191 issued to Lewis H. Gaines on May 23, 1978 suggests the use of aluminum for incorporation in a particulate form (e.g. powder or fibers) into $TiS_2$ active material and for use as a screen or perforated sheet onto which a mixture of the cathode-active material and the particulate metal is molded or pressed. The particulate metal is added in amounts of up to 50 wt.%, preferably between 5 and 20 wt.% to the active material ($TiS_2$). Additionally, from 1 to 20 wt.% preferably from 2 to 10 wt.%, of a binder is admixed with the particulate metal and active material and the mixture is molded at pressure of up to 165 MPa (24000 psi) into a desired shape, e.g. about a perforated aluminum plate.

The disadvantages of this procedure lie in larger amounts of the particulate metal (powder or fiber) which, while adding strength and conductivity to the cathode structure, reduce the amount of cathode active material being included in a certain volume of a cathode electrode; addition of the binder further adds to the bulk of the molded material. Furthermore, expanded metal screens or grids, e.g. of nickel, cooper or thier alloys (commercially available from Exmet Corporation), rather than perforated sheet or screen of aluminum, have been typically used recently in the production of rechargeable non-aqueous alkali cells, primarily due to commercial availability and relative strength of the screen or grid made of such expanded metals. However, fibers of cathode-active material (e.g. niobium triselenide) on both sides of strands of a screen or grid of expanded metal such as nickel (e.g. 3Ni5.125) are more compressed relative to the fibers in the open areas. The compressed area exert more pressure on the separator during cycling enabling lithium to plate through the pores of the separator. The screen or grid also focuses the current at the intersection of the metal strands resulting in a nonuniform current distribution, thus increasing chances of forming an internal short. (Internal shorts are electric paths between the cathode (e.g. $NbSe_3$) and the alkali metal anode (e.g. Li) that develop through a separator during the charging phase.) The cells with these internal shorts manifest charge capacities which are larger than their discharge capacities. Their capacity will also fade faster with each cycle. These problems are not unique for the expanded metal grids or screens, but may occur also in cells with cathodes in which the current collector is in the form of a flat screen or perforated sheet.

Thus, a cell with a cathode which not only ameliorates the above shortcomings, but also is adaptable for mass-production use, is highly desirable.

SUMMARY OF THE INVENTION

The invention is a non-aqueous alkali metal e.g. lithium, cell in which the positve electrode (the cathode) has a unique laminated structure produced by conductively bonding mats (or sheets) of cathode-active material selected from transition-metal chalcogenides to a surface of a metal foil which acts as a current collector. Other structural features of the non-aqueous cell including negative electrode (anode), non-aqueous electrolyte and separator, are generally conventional. More specifically, the cathode is composed of a current collector consisting of an unperforated metal foil coated with a polymeric adhesive bonding mats (or sheets) of cathode active material to the foil. Conductive particles, such as carbon black, are used either as an additive to the polymer or as a thin coating on the cathode-active material facing the foil to provide an electronic bond between the foil and the mats. Some other conductive particles, such as an inert metal, may be used for the some purpose. Other structural feature of the non-aqueous cell including negative electrode (anode), non-aqueous electrolyte and separator, are generally conventional.

Cells with cathodes having the metal foil current collector provide performance and reliability which meets the cells with expanded metal current collector without added cost. In the preferred embodiment the metal foil is of aluminum, the active anode material is lithium and the active cathode material is $NbSe_3$. Aluminum foil has advantages of lower cost, lighter weight, higher electrical and thermal conductivity. Aluminum foil is about five times cheaper than nickel expanded metal or aluminum expanded metal and about 50 percent lighter than nickel expanded metal. Cells with aluminum foil current collector have a lower cell impedance which results in significant improvement in both high rate discharge and low temperature performance. As a result of lower cell impedance, as well as more uniform current distribution, the cell can deliver more energy at low temperatures. For example, an AA size cell discharged at 4A, room temperature, shows a 33% improvement in energy and a cell discharged at 200mA, at −20° C., shows an 35% improvement as compared to the cell using a cathode with Ni expanded metal current collector. The softness as well as the absence of sharp edges and high spots in the aluminum foil tend to reduce the shorting frequency. Furthermore, because of the smooth surface of aluminum foil, the cathode can be compressed more uniformly to a thinner thickness without forming areas of a highly compressed $NbSe_3$. The use of the invention described below permits production of these cells on a mass-production basis.

DETAILED DESCRIPTION

The present invention relates to a non-aqueous alkali metal recharageable cell with a unique cathode electrode. A non-aqueous alkali metal cell generally includes an anode, a separator, a cathode and an electrolyte which are enclosed within a suitable container. A great variety of cell structures may be used in the practice of the invention. Contemplated are cells of various sizes and shapes with varied amounts of electrolyte, as is well known in the art. Particularly attractive are rolled cylindrical cells.

Figure 1:
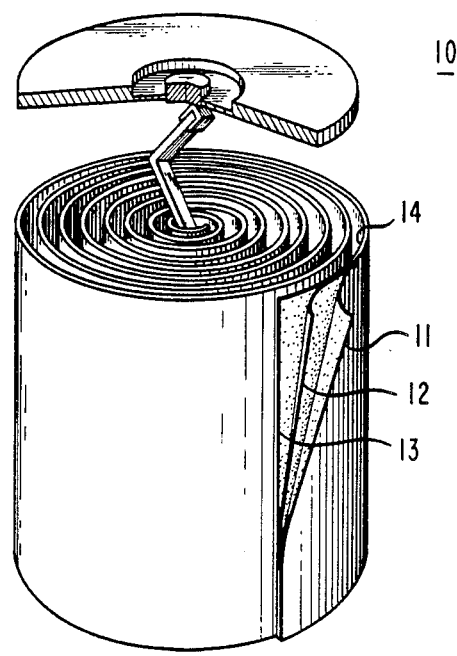
FIG. 1 shows schematically an exemplary rolled non-aqueous cylindrical cell made in accordance with the invention.
Figure 2:
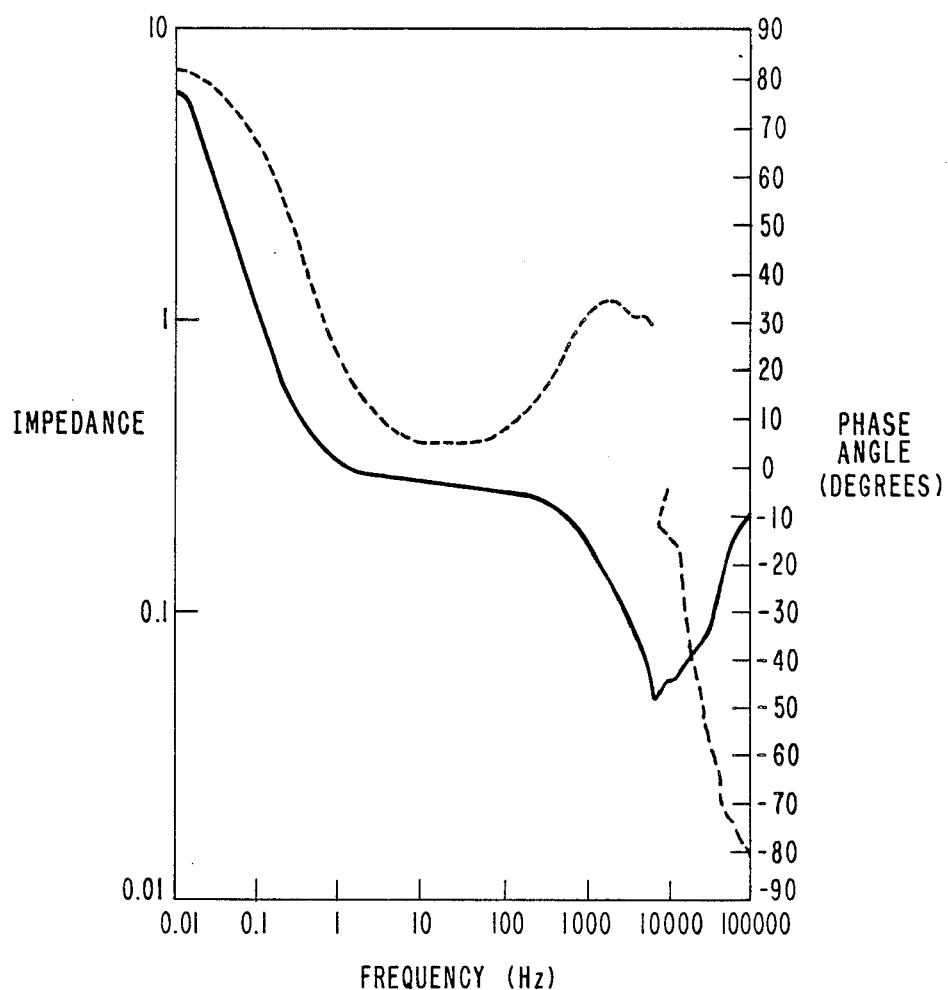
FIG. 2 shows the A.C. impedance of an uncycled cell with an aluminum foil current collector.
Figure 3:
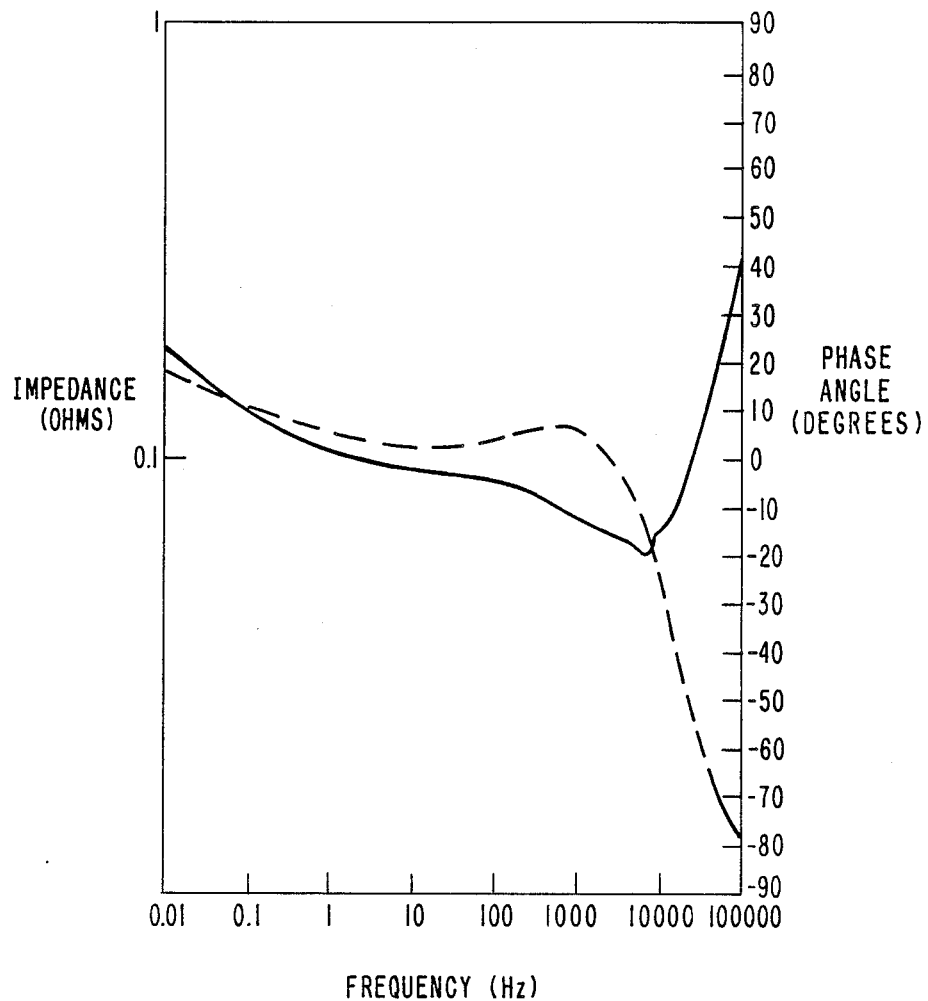
FIG. 3 shows an A.C. impedance of a cell with an aluminum foil current collector after 20 cycles.

FIG. 1 shows schematically a typical cell structure 10 useful in the practice of the invention. This type of structure is often called the rolled cylindrical cell structure produced by putting several, usually four, layers together and rolling them into a cylindrical shape. The four layers are a negative electrode (anode) 11, a separator 12, a positive electrode (cathode) 13, and another separator 14. The roll is generally enclosed within an enclosure or container (not shown) with suitable electrical connections (tabs) to the positive and negative electrodes. The container is filled with an appropriate electrolyte to permit electro-chemical action. Such rolled cells are described in U.S. Pat. No. 4,740,433 issued to W.P. Lu on Apr. 26, 1988 and U.S. Pat. No. 4,753,859 issued to L. E. Brand on Jun. 28, 1988. These patents are directed, respectively, to cells with an improved separator material and electrolyte system useful in the practice of this invention and are incorporated herein by reference. U.S. application Ser. No. 353,574 filed on May 18, 1989, in the name of S. M. Granstaff et al. (Case 4–5), also incorporated herein by reference, describes a lithium cell with an improved laminated negative electrode (anode) useful in practicing the present invention.

Active anode electrode materials useful in the practice of the invention include lithium, sodium, potassium, rubidium, cesium and combinations of these metals. Lithium is most preferred because of the high electrical potentials obtained with this material and excellent compatibility with various active positive electrode materials.

Electrolyte systems useful in the practice of the invention typically are made up of a solvent (often multicomponent) together with one or more current carrying species (e.g. salts) dissolved in the solvent. Particularly advantageous are solvents made up of such components as propylene carbonate, ethylene carbonate, dialkyl carbonates (e.g. diethyl carbonate) and various polyethylene glycol dialkyl ether (glymes) such as diglyme, triglyme and tetraglyme.

Salts useful as the current carrying species in the electrolyte system are well known in this art. Typical examples are $LiAsF_6$, $LiClO_4$, $LiCF_3SO_3$, $LiBF_4$, $LiAlCl_4$, $LiI$ and $LiBr$. Ammonium salts are also useful as current-carrying species in electrolytes for non-aqueous cells. Useful ammonium salts are tetraalkylammonium salts with anions such as hexafluoroarsenate, hexafluorophosphate, tetrafluoroborate, perchlorate and halides such as chlorine, bromine and iodine and alkyl groups with up to six carbon atoms. Tetrabutylammonium salts and tetraethylammonium salts are preferred because of availability, high solubility, stability and good conductivity exhibited by such electrolytes. Electrolytes with more than one salt (e.g., $LiPF_6$ and $LiAsF_6$) may also be used. Preferred is the mixture of lithium salt (preferably $LiPF_6$ and/or $LiAsF_6$) and tetraalkylammonium salts (e.g., one or more of the tetrabutylammonium salts and tetraethylammonium salts). Such a mixture of salts yields exceptionally high charge and discharge rates especially at low temperatures. The concentration of current-carrying species may vary over large limits, typically from 0.5 molar to saturation. Preferred concentrations are often determined by the concentration of maximum conductivity of the electrolyte solution, often around 0.25 to 0.75 of the saturation concentration. For example, for lithium salts, such as $LiPF_6$ and $LiAsF_6$, typical concentration are 0.4 to 1.5 molar with 0.6 to 1.0 molar being preferred. For tetra-alkylammonium salts, concentration between 0.1 and 1.0 molar are typical. For mixtures of lithium salts and tetra-alkylammonium salts, lithium salt concentrations of 0.4 to 0.8 molar and tetra-alkylammonium salt concentrations of 0.2 to 0.4 molar are preferred.

Separator materials useful in the practice of the invention generally are polymer materials, such as polyethylene or polypropylene made in the form of microporous films. Preferred are various microporous polypropylene separators such as Celgard ® 2400 and Celgard ® 2402 made by the Celanese Corporation. Also useful are grafted separator materials such as the those described in U.S. Pat. No. 4,740,433 issued to Wen-Tong P. Lu on Apr. 26, 1988, incorporated herein by reference.

A variety of positive electrode active materials may be used, including transition - metal chalcogenides selected from $NbSe_2$, $NbSe_3$, $NbS_3$, $MoS_2$, $MoS_3$, $TiS_2$, $TiS_3$, $TaSe_3$, $TaS_2V_6O_{13}$ and $MoO_2$. Niobium diselenide, niobium triselenide and niobium trisulfide, described in U.S. Pat. No. 3,864,167, which is incorporated herein by reference, are especially useful for use with lithium anode active material. Particularly good results are obtained when using niobium triselenide as the active positive electrode material. Such cells exhibit very high energy densities, long shelf life and long cycle life.

This invention is illustrated with reference to a rechargeable, non-aqueous alkali-metal cell in which the active-anode material is lithium and the active-cathode material is niobium triselenide. Nevertheless, the teachings presented for the illustrated embodiment are applicable to other rechargeable nonaqueous alkali-metal cells.

In the exemplary preferred embodiment, the cathode was fabricated by bonding $NbSe_3$ mats (or sheets) to aluminum foil. Commercial Reynolds Wrap ® aluminum foil with a thickness ranging from 0.001 to 0.002 cm. (0.0004 to 0.0007 inches) was used for the current collector material without further processing. Mats of $NbSe_3$ may be prepared in a variety of ways. Typically, the mats are about 0.012 cm (0.0047 inches) in thickness. Thinner or thicker mats may be used as well. One especially suitable manner of fabrication $NbSe_3$ or (or $NbS_3$) mats is described in U.S. patent application Ser. No. 244,218, filed on Sept. 14, 1988 in the name of W. Fange and B. Vyas, entitled "Non-aqueous Cell Comprising Niobium Triselenide". Briefly, the mats (or sheets) are produced by a method that includes deposition of layer of a liquid suspension of niobium powder in an inert liquid, e.g. propylene glycol, on a suitable substrate e.g. alumina, removal of the liquid from the layer, and reaction of the niobium powder with vapor of selenium (or sulfur). In a specific embodiment using selenium, the reaction was conducted at temperatures ranging from 625° C. to 780° C. for a period of from 2 hours to 5 days. The process may include a first pre-reacting stage including heating at a temperature of from 520° C. to 625° C. from 4 to 24 hours, which may precede the reacting stage.

The mats (or sheets) were bonded to the aluminum foil using the following two procedure variants. Both cathode fabrication variants give similar cell performance; however, the second variant is cleaner, simpler and better adaptable to mass production.

The first variant includes applicant of a thin layer of carbon black (Cabot Vulcan XC72) on one side of $NbSe_3$ mats followed by placing the mats, with carbon-coated side facing the aluminum foil, on both sides of a polymer-coated aluminum foil, then passing the so-formed composite between rollers to compress the composite to a desirable thickness, typically to form 0.010 to 0.013 cm. (0.004 to 0.005 inches). Other compression techniques may be used as well. The polymer-coated aluminum foil was prepared by applying a thin layer of a solution of one weight percent (wt. %) EPDM in cyclohexane on the aluminum foil just before the carbon black coated $NbSe_3$ mats were placed on the foil to avoid solution drying out due to the volatile nature of cyclohexane. EPDM stands for a terpolymer of ethylene, propylene and diene and is commercially available from Exxon Chemical Company as Exxon V-4608 [chemical formula $(C_2H_4)_x(C_3H_6)_y(C_9H_{12})_z$ x=0.4–0.8, y=0.2–0.6, z=0–0.1, by wt.] Other polymers, such as polyethylene oxide, silicone and polyurethane may be used in place of or in admixture with the EPDM.

The second variant comprises applying a well-mixed slurry of the EPDM, carbon black and cyclohexane on the aluminum foil, placing $NbSe_3$ mats upon both sides of the coated aluminum foil and then compressing the composite in the manner similar to that of the first variant. The slurry has an approximate composition of 2EPDM/4 carbon black/94 cyclohexane in wt.%.

Cathodes prepared by either variant were dried in a vacuum oven at about 70° C. for about ½ hour to remove residual solvent (cyclohexane) in the cathode. Other suitable temperatures and times may be used. In both method variants, the amount of carbon black in the finished cathode may be present within a range of from 0 to 20 wt.%, preferably from 0.5 to 5 wt.% with 1 to 3 wt.% being most preferred and the amount of the polymer may be present within a range of from 0.1 to 15 wt.%, preferred from 0.1 wt.% with from 0.3 to 0.5 wt.% being most preferred. The carbon black is desirable for providing an enhanced electronic conduction path between aluminum foil and $NbSe_3$ mats for electrochemical reactions. Other conductive particles, such as of inert metals mentioned above, may be used instead of or in combination with carbon black.

The so-formed cathodes were trimmed to a desirable dimension suitable for cell construction [for an AA size cell typically 3 cm. by 44.5 cm. (1.55" by 17.5")]. The leads of electrical connection of the cathode were made by pre-welding nickel or copper tabs to aluminum foil. The leads for electrical connection of the anode are also nickel or copper tabs pre-welded to the current collector of the anode.

The cycle behavior of cells with the aluminum foil cathode current collectors was obtained by testing cylindrical AA size cells filled with 0.8 M $LiAsF_6$ in a mixture containing 35 mol% propylene carbonate, 35 mol% ethylene carbonate and 30% mol triglyme. Similar AA cells with a nickel expanded metal cathode current collectors were used. The cells were tested by cycling at discharge currents ranging from 100 mA to 4000 mA; the cells were charged at 100 mA and 120 mA. The voltage range during cycling was from 1.4V to 2.4 V. The cycling was conducted at temperatures ranging from −20° C. to 45° C.

Impedance measurements and performance data of cells with the aluminum foil cathode current collector are presented below. The cell impedance was measured with a Schlumberger EMR 1170 Frequency Response Analyzer and a Solartron 1186 Electrochemical Interface (the cell's potential was held at the OCV value during the impedance measurement.) All cells, with the exception of fresh cells, were charged to 2.4 V before measuring their impedance. The cell impedance at 1 Hz is chosen for comparison because it is close to the DC resistance of the cell. Because there is a variation in cell capacities, the cell energies were multiplied by the ratio ACTUAL CAPACITY/1300; this factor normalizes all the cells' capacities around 1300 mAh and allows for a proper comparison of energies. In the cycle life data plots the capacities were normalized by the cell's first cycle capacity to 1.05 V.

Figure 4:
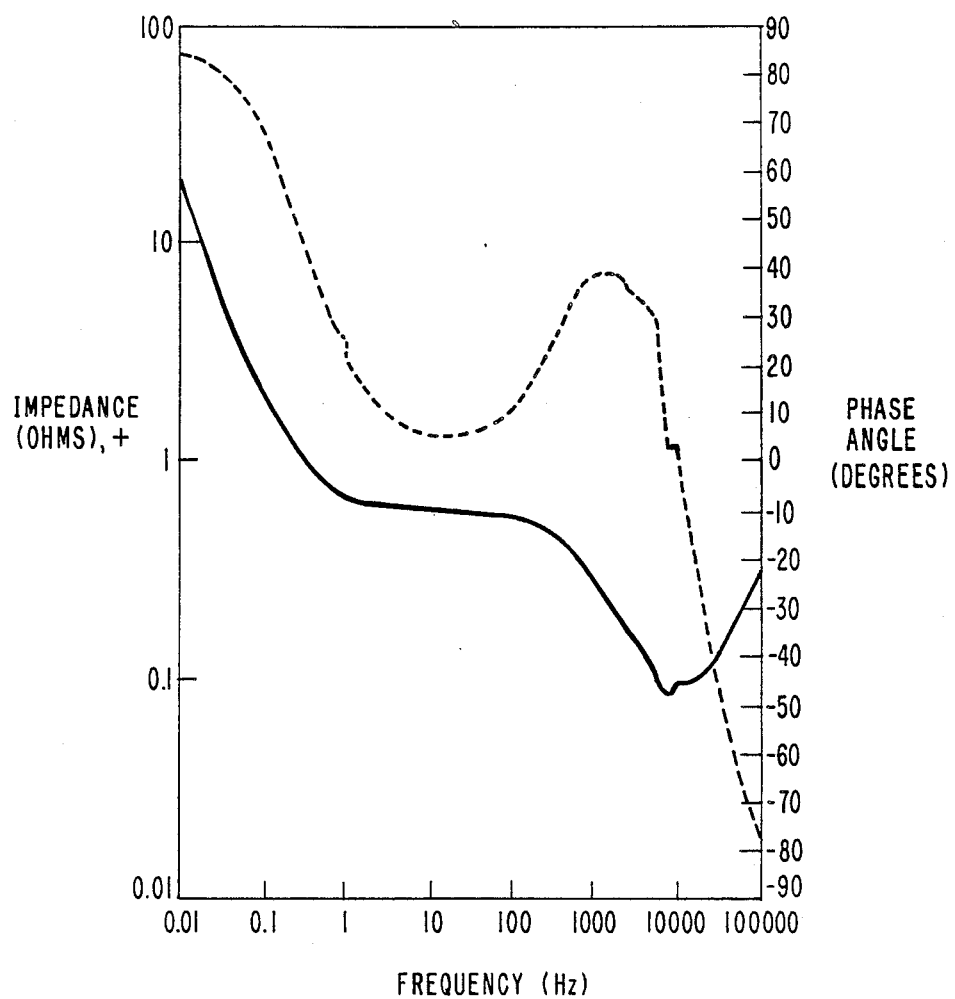
FIG. 4 shows the A.C. impedance of an uncycled cell with the prior art expanded-metal Ni current collector.
Figure 5:
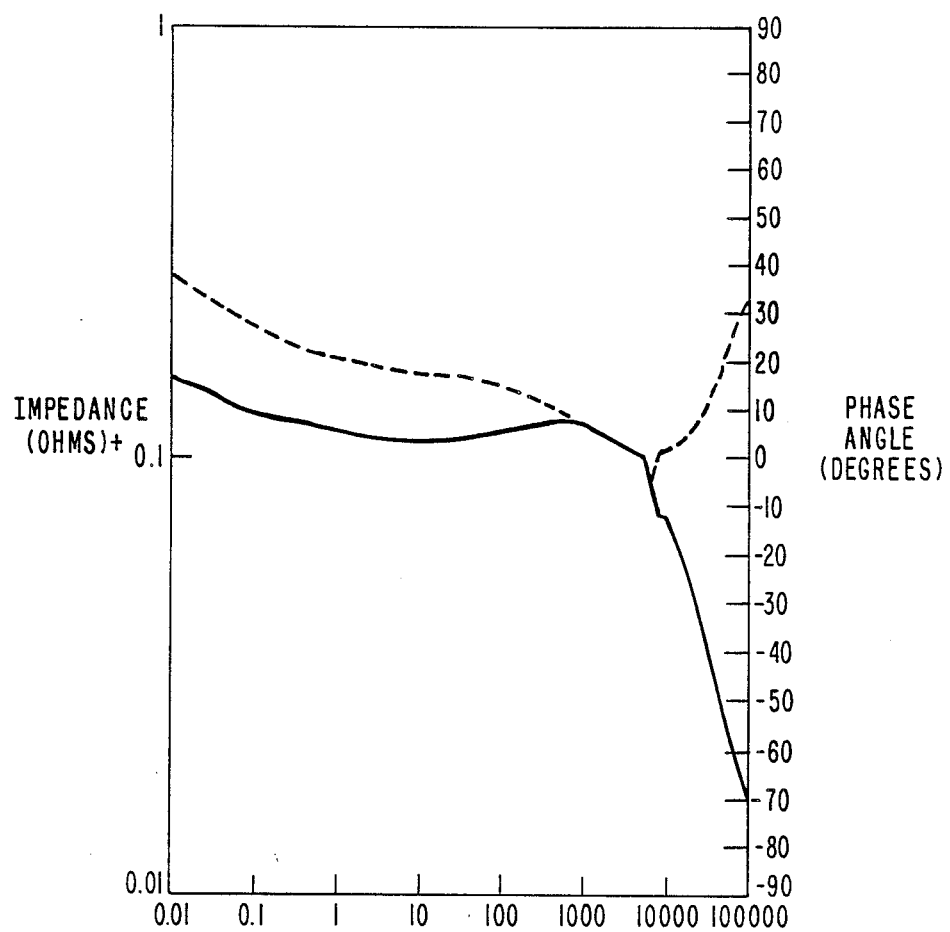
FIG. 5 shows the A.C. impedance of a cell with the prior art expanded-metal Ni current collector after 20 cycles.

The impedance measurements for cells with the aluminum foil current collector (FCC) and nickel expanded metal current collector (EMCC) are shown in FIGS. 2 and 3 and FIGS. 4 and 5, respectively. A fresh uncycled cell with the FCC cathode has a 1 Hz impedance of 0.3 ohms (FIG. 2) whereas an uncycled cell with the EMCC cathode has an impedance of 0.7 ohms at 1 Hz (FIG. 4). After twenty cycles the cell with the FCC cathode has 1 Hz impedance of 0.11 (FIG. 3) ohms and the cell with the EMCC cathode has a 1 Hz impedance of 0.17 ohms (FIG. 5). The lower impedance in the cell with the aluminum FCC cathode is the result of higher electronic conductivity (2.6 times that of nickel) and larger contact area (~3.7 times that of the expanded metal). Although the presence of the polymer binder increases the contact resistance, the net effect is still about a 35% reduction in cell impedance.

Figure 6:
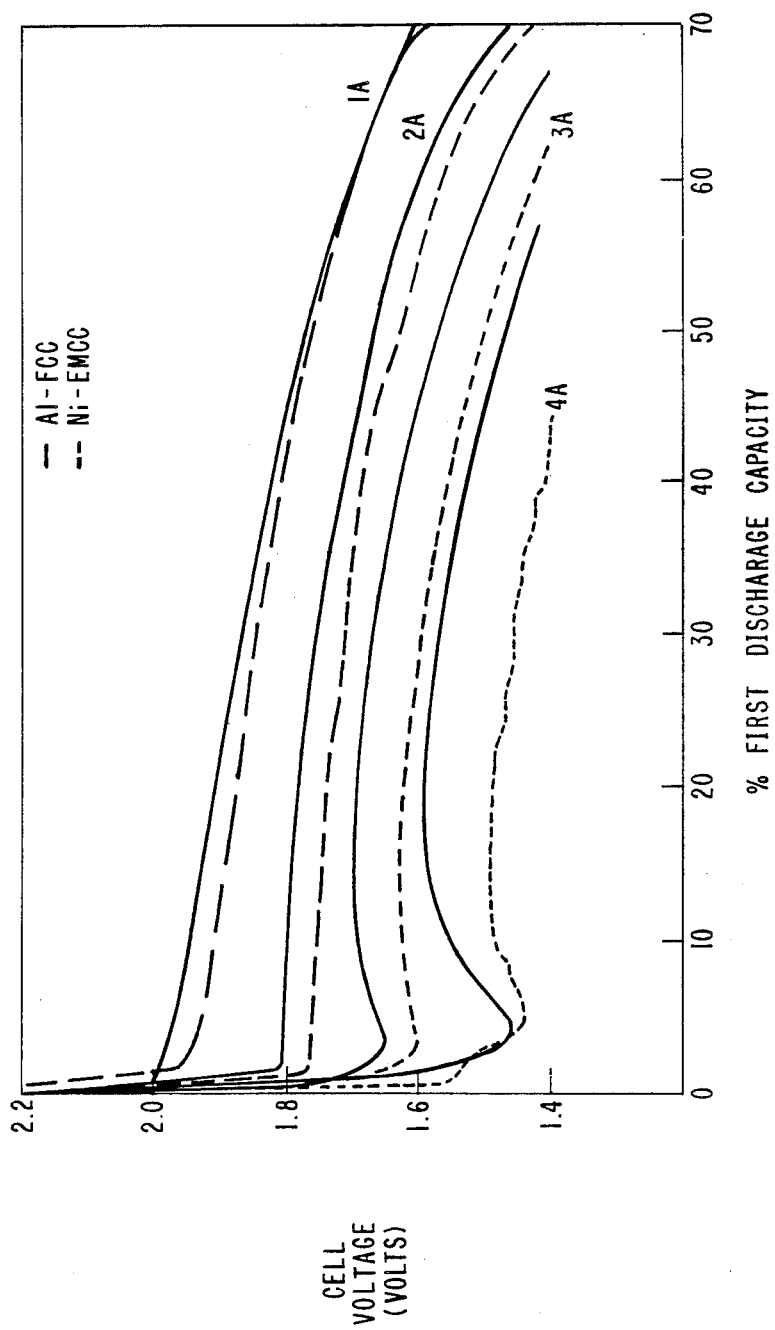
FIG. 6 shows comparisons of discharge voltage curves at different discharge currents for Al-foil current collector and prior art Ni expanded metal current collector.
Figure 7:
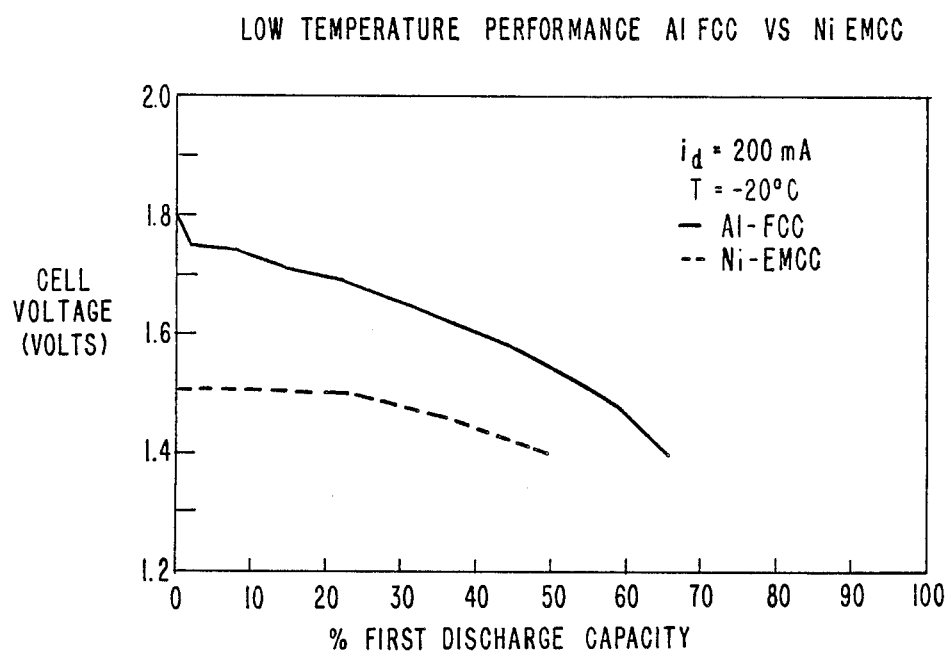
FIG. 7 shows comparisons of discharge voltage curves at −20° C. for Al-foil current collector and prior art Ni expanded-metal current collector.

The lower impedance in cells with the FCC cathodes results in overall higher voltage discharges. FIG. 6 shows discharge curves of cell voltages versus percent capacity for the 1A, 2A, 3A and 4A discharges of cells with the FCC cathode (solid line) and EMCC cathode (dotted line), respectively as measured at room temperature (~25° C.). The cells were cycled twenty times before performing the 1A to 4A discharges. The curves show a significant improvement in capacity and mid-discharge voltage for the FCC cell at all four currents. The improvement in energy, as may be seen from Table I, for the cell with FCC over the cell with EMCC is small for the 1A and 2A cases, but becomes significant for the 3A and 4A cases with improvements of 10% and 33% respectively. The 200 mA discharges at −20° C. are shown in FIG. 7. The cell with FCC cathode has an energy of 1.179 Wh as compared to 0.945 Wh for the cell with EMCC cathode; this translates to a 25% energy improvement at −20° C. The voltage advantage of the cell with FCC cathode becomes larger at higher rates and at lower temperatures. There are no significant differences at moderate rates (~400 mA) and temperature (~25° C.).

Figure 8:
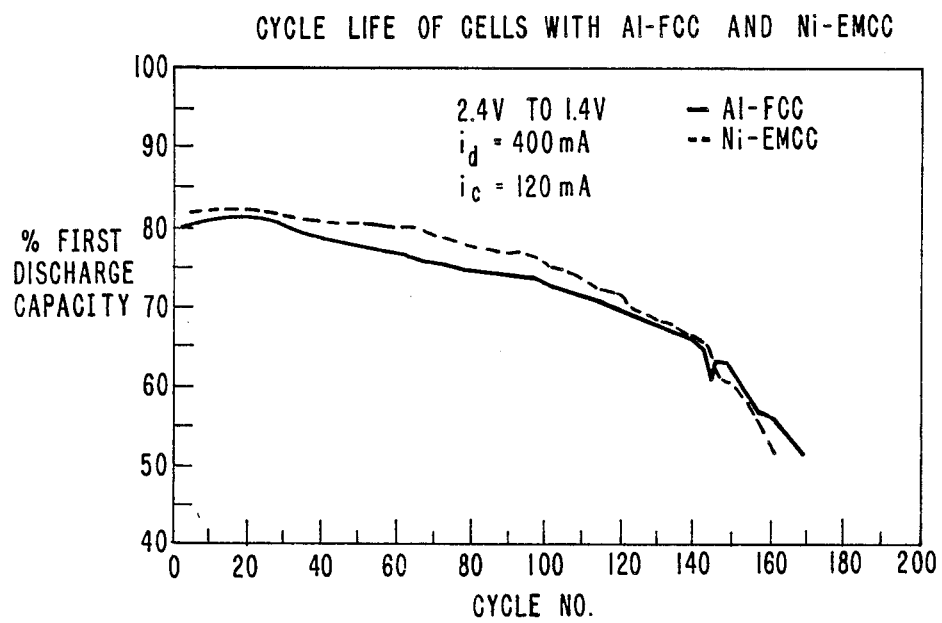
FIG. 8 shows the cycle life for Al-foil current collector and prior art Ni expanded metal current collector.
Figure 9:
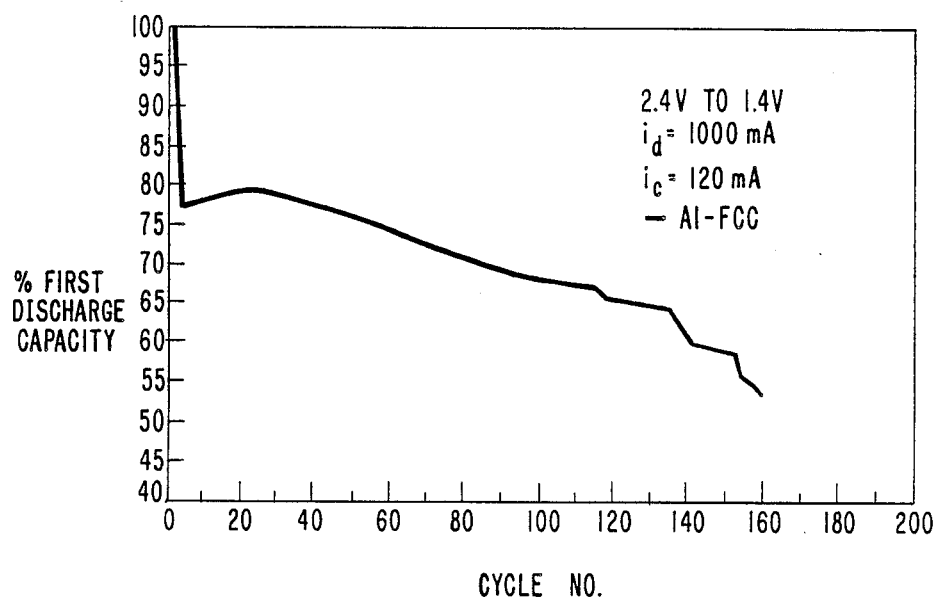
FIG. 9 shows the cycle life performance at 1000 mA discharge current for Al-foil current collector.

Cells with the FCC cathodes and the cells with the EMCC cathodes were tested also for cycle life. FIG. 8 shows the cycle life for cells with FCC cathodes and EMCC cathodes tested at room temperature (~25° C.). Both cells yield ~150 cycles to a cutoff of 60% capacity; this is typical cycle life for an electrochemical cell when discharged at 400 mA and charged at 120 mA. At a higher discharge current of 1000 mA, cell with FCC cathode yielded 145 cycles at the 60% capacity cut off (FIG. 9). Both cells with FCC and with EMCC cathodes, at 45° C., shorted after about 120 cycles, respectively.

TABLE I

| Energies At Different Discharge Currents For Al Foil and Ni Expanded Metal Substrate | | | |
|---|---|---|---|
| Discharge Current (Ampere) | Al Foil (FCC) (Wh) | Ni Exmet (EMCC) (Wh) | % Improvement Over Ni Exmet |
| 1A | 1.872 | 1.855 | 0.9 |
| 2A | 1.641 | 1.573 | 4.3 |
| 3A | 1.410 | 1.280 | 10.2 |
| 4A | 1.170 | 0.880 | 33.0 |

We claim:

1. A process of production a non-aqueous secondary cell comprising an alkali metal anode electrode, a cathode electrode with cathode active material, a separator, and an electrolyte comprising an organic solvent having an alkali metal dissolved therein, said cathode active material comprisng at least one chaloceginde material selected from the group consisting of $NbSe_2$, $NbSe_3$, $NbS_3$, $MoS_2$, $TiS_2$, $TiS_3$, $TaSe_3$, $TaS_2$, $V_6O_{13}$, $CoO_2$ and $MoO_2$, said process including the step of assembling the anode electrode, the cathode electrode, the separator and the electrolyte to form a non-aqueous secondary cell, wherein said positive electrode is produced by bonding mats of positive electrode active material to opposite surfaces of a metal foil acting as a current collector, the metal being chemically inert under operating conditions of the cell, said bonding including coating said opposite surfaces of the metal foil with a layer of a bonding polymer, placing mats of positive electrode active material in contact with said coated surfaces of the foil so as to form a metal foil and mats composite, and compacting the composite to a desired thickness.

2. The process of claim 1 in which an electronic conduction path between the metal foil and the cathode active material is enhanced by incorporation powdered conductive material between the metal foil and the cathode active material.

3. The process of claim 2 in which the conductive material is carbon black included within a range of from 0 to 20 wt.%, based on the total wright of the cathode.

4. The process of claim 2 in which the conductive material is carbon black included within a range of from 0.5 to 5 wt.%, based on the total weight of the cathode.

5. The process of claim 2 in which the conductive material is carbon black included within a range of from 1 to 3 wt.%, based on the total weight of the cathode.

6. The process of claim 2 in which,
prior to placing the mats onto the foil, that side of each mat whi is to be bonded to the foil is coated with a layer of carbon black.

7. The process of claim 6 in which said bonding polymer comprises a solution of 1 weight percent of EPDM (ethylene/propylene/diene-terpolymer) in cyclohexane.

8. The process of claim 1 in which
said coating step is effected by coating both of said surfaces of the foil with a slurry of EPDM (ethylene/propylene/diene-terpolymer), carbon black and cyclohexane.

9. The process of claim 8 in which said slurry has an approximate compostion of 2 EPDM/4 carbon black/94 cyclohexane, all in weight percent.

10. The process of claim 1 in which the compacted composite is dried to remove any residual solvent.

11. The process of claim 1 in which the amount of polymer in the cathode ranges from 0.1 to 15 wt.%, based on the total weight of the cathode.

12. The process of claim 1 in which the amount of polymer in the cathode ranges from 0.1 to 1 wt.%, based on the total weight of the cathode.

13. The process of claim 1 in which the amount of polymer in the cathode ranges from 0.3 to 0.5 wt.%, based on the total weight of the cathode.

14. The process of claim 1 in which said compacting is effected by passing the composite between rollers.

15. The process of claim 1 in which said alkali metal is selected from the group consisting of lithium, sodium, potassium, rubidium and cesium and alloys thereof.

16. The process of claim 1 in which said alkali metal comprises lithium.

17. The process of claim 1 in which said cathode active material is $NbSe_3$.

18. The process of claim 1 in which said metal foil comprise a metal selected from a group consisting of aluminum, magnesium, titanium, zinc, lead, iron, nickel, copper and alloys thereof.

19. The process of claim 1 in which said metal foil is aluminum.

20. The process of claim 1 in which said alkali metal is lithium, said cathode active material is NbSe$_3$, and said metal foil is aluminum, and said bondig comprises coating opposite surfaces of the foil with a slurry of EDPM (ethylene/propylene/diene-terpolymer), carbon black and cyclohexane.

21. The process of claim 19 in which said slurry has an approximate composition of 2 EPDM/4 carbon black/94 cyclohexane, all in weight percent.

* * * * *